United States Patent [19]

Younse et al.

[11] Patent Number: 4,805,023

[45] Date of Patent: Feb. 14, 1989

[54] PROGRAMMABLE CCD IMAGER DEFECT COMPENSATOR

[75] Inventors: Jack M. Younse; Robert J. Gove, both of Dallas, Tex.

[73] Assignee: Texas Instruments Incorporated, Dallas, Tex.

[21] Appl. No.: 96,797

[22] Filed: Sep. 8, 1987

Related U.S. Application Data

[63] Continuation of Ser. No. 787,399, Oct. 15, 1985, abandoned.

[51] Int. Cl.⁴ .............................................. H04N 3/15
[52] U.S. Cl. ............................................... 358/213.17
[58] Field of Search .................. 358/213.17, 163, 167; 250/578

[56] References Cited

U.S. PATENT DOCUMENTS

| | | | |
|---|---|---|---|
| 4,167,754 | 9/1979 | Nagumo et al. | 358/167 |
| 4,237,488 | 12/1980 | Takemura | 358/163 |
| 4,473,845 | 9/1984 | Davy | 358/163 |
| 4,524,390 | 6/1985 | Lemke | 358/163 |
| 4,628,352 | 12/1986 | Boue | 358/213.17 |

Primary Examiner—L. T. Hix
Assistant Examiner—David M. Gray
Attorney, Agent, or Firm—Thomas R. Fitzgerald; Leo N. Heiting; Melvin Sharp

[57] ABSTRACT

The disclosure relates to a method and system for improving the cosmetic appearance of a display responsive to signals from a CCD wherein the locations of defects in the CCD are located and stored and wherein, upon scanning of a defective pixel in the CCD, a comparison is made and sucessive succeeding signals to the display are not altered while defective pixel addresses continue to be addressed.

4 Claims, 3 Drawing Sheets

PROGRAMMABLE CCD IMAGER DEFECT COMPENSATOR

This application is a continuation of application Ser. No. 789,399, filed Oct. 15, 1985, now abandoned.

BACKGROUND OF THE INVENTION

1. Field of the Invention

This invention relates to CCD imager cameras and, more particularly, to a system for compensating for defects in the CCD.

2. Brief Description of the Prior Art

Solid state imagers, such as CCDs, in the past, have normally been found to have numerous faults which have appeared as black and/or white dots or lines on a TV monitor. These defects were objectionable and it was highly desirable that such signals be removed from the TV monitor by removing the signals emanating from the CCD indicative thereof prior to the time such signals reached the TV monitor circuitry for display thereon. This was very difficult in the prior art because of the very large number of such defects encountered in almost every CCD sampled. It is apparent that, if these defects can be electronically removed, as far as cosmetic appearance is concerned, the yield of usable CCDs can be considerably increased. The prior art attempts to provide such improvements in cosmetic appearance have involved automatically correcting for such defects as suggested by Skaggs et al., Ser. No. 677,320, filed Dec. 3, 1984, which is incorporated herein by reference. However these methods also affected the data without defect for spatial frequencies near the limiting Nyquist frequency limits. Such defect minimizing or correcting methods have therefore not found great acceptability in the art. However, with the improvements in processing techniques, CCDs are presently available wherein a great percentage of those produced have only a few defects. Accordingly, it is now possible to provide CCDs wherein defects can be easily located and compensation therefore provided using programmable techniques.

SUMMARY OF THE INVENTION

The dark current pattern of a CCD camera, such as, for example a TIC9A and TIC 9L, will display the defects of the imager as saturated white images ranging from a point to groups of line defects. The defect compensator to be described herein inhibits the sample and hold pulse of a predetermined defective pixel or group of pixels in succession for each horizontal line of video.

Possible defect corrections are limited to the following due to design constraints:

(1) one vertical line from top to bottom or one successive group of lines from top to bottom.

(2) a single point defect per horizontal line or a single horizontal "stream" per line.

(3) double point correction if pixels are separated by 254 pixels per line.

(4) double vertical line on each horizontal line if the defects are separated by 254 pixels.

Briefly, in accordance with the present invention, there is provided a circuit whereby defects in a particular CCD are accurately located and the address thereof or addresses thereof are stored in a storage device such as, for example, a programmable read only memory (PROM). In the case of the PROM, the addresses of the defective pixels are preferably burned therein so that the PROM can be used as part of the CCD circuit and is unique for the particular CCD with which it is associated and for which the defective pixel addresses are stored. Since substantially all CCDs have a pixel address counter as part of the circuit thereof, this pixel address counter always provides an address of the particular pixel in the CCD being scanned at any time. This address in the pixel address counter is compared with the stored addresses in the PROM of those pixels in the CCD which have defects by means of a comparator. When a comparison is noted in the comparator, this comparison being interpreted as the scanning of a defective pixel, the comparator provides an output to an inhibit circuit which will inhibit the TTL S-H (sample-hold) trigger signal from being applied to the sample and hold circuits via the sample hold driver asset forth in pending application Ser. No. 768,077, filed 8-21-85 of Younse and Russell (TI-8521). Since the TTL sample hold trigger signal is inhibited, the contents of the sample and hold circuits of said application are not moved along, thereby preventing the signal from the defective pixel from being entered into the sample and hold circuit. This signal from the defective pixel is therefore lost and the result is that the non-defective pixel scanned prior to the defective pixel is displayed in the defective pixel location. This prevents the appearance of either black or white dots at the location of the defective pixel.

DESCRIPTION OF THE PREFERRED EMBODIMENT

Figure 1:
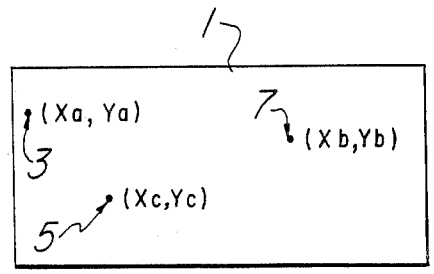
FIG. 1 is a diagram of a CCD having defective pixels at the addresses indicated.

Referring now to FIG. 1, there is shown a schematic diagram of the face 1 of a CCD showing the location of defective pixels therein, three such defects 3, 5 and 7 being shown. It can be seen that the defective pixels have been provided with address locations $(x_a, y_a)$, $(x_b, y_b)$ and $(x_c, y_c)$. The exact locations of these defective pixels are determined by a calibration scan with the current value of the pixel address counter when the defective pixel, being stored in an array to be used in blowing the PROM. A typical arrangement for programming the location of defective pixels is wherein a CCD camera with the CCD under test therein is illuminated with a uniform light source at 50% full well level. The camera then scans the entire CCD field and a defect mapper microprocessor controlled unit detects those pixel locations during scan wherein a signal different from the nominal ½ well signal by a predetermined amount (programmable) is measured and stores the addresses thereof in a temporary random access memory (RAM). This is done for all defects and the locations of these defects are then programmed into a programmable ROM (PROM) and burned therein so that the data is permanently stored therein, indicating the locations of the defective pixels. This PROM is unique to the CCD for which it is programmed and will be associated therewith.

Figure 2:
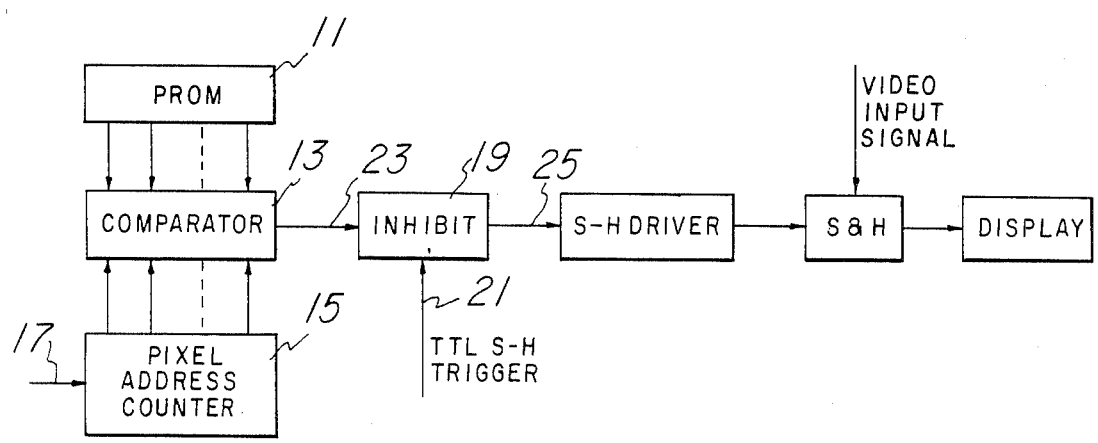
FIG. 2 is a schematic diagram of a circuit for inhibiting the display at locations corresponding to defective pixels in a CCD.

In an actual circuit as shown in FIG. 2, the PROM 11 is connected to a comparator 13. A pixel address counter 15 is also coupled to the same comparator 13, the pixel address counter having an input 17 thereto which steps the counter each time that the scanning of the CCD has moved to a new address so that the actual address of the pixel being scanned is located in the pixel address counter 15. When the address in the pixel address counter 15 is the same as one of the addresses in the PROM 11, such comparison will be noted in the comparator 13 and provide a signal to the inhibit circuit 19. The inhibit circuit is of well known type and will permit signals from the TTL sample hold trigger 21 to pass therethrough at all times except when an inhibit pulse is received on the line 23 from the comparator 13, at which time the output 25 of the inhibit circuit 19 has no signal thereon. The signal on the line 25 is passed to sample-hold circuits of the type set forth in said copending application (TI-8521) and will inhibit transfer of data from such sample-hold circuits due to lack of the trigger pulse on the line 25. This will cause the data then in the sample-hold circuits of said copending application to be retained therein until a new address is registered in the pixel address counter. The end result is that the signal in the sample-hold circuit will be utilized for its normal address location as well as the address location for the defective pixel with the signal appearing from the defective pixel being lost due to its inability to be stored in the sample-hold circuits. This procedure provides for a cosmetically improved display with unwanted black and/or white dots and/or lines being eliminated.

Figure 3:
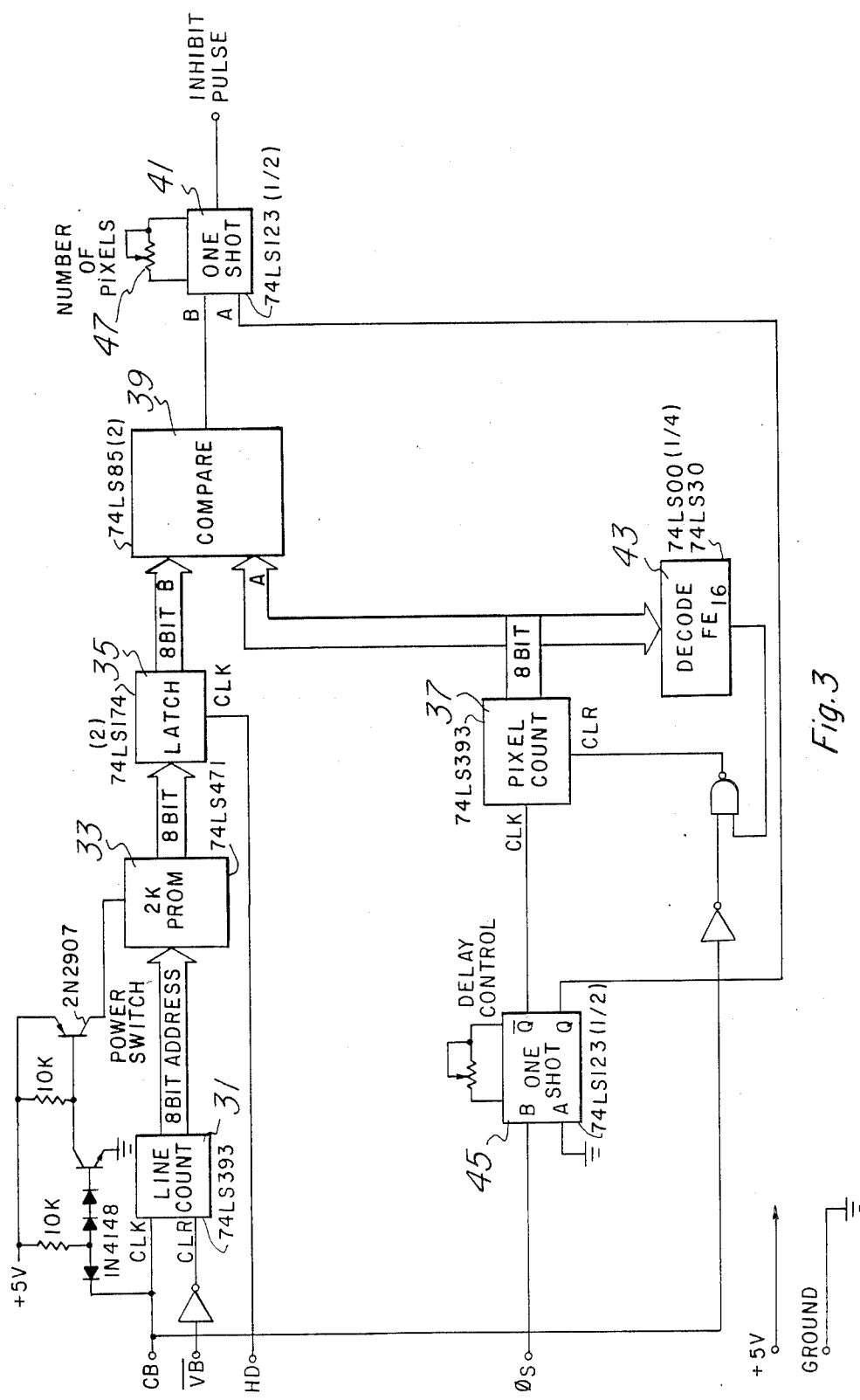
FIG. 3 is a circuit diagram of a preferred embodiment of a programmable defect compensator in accordance with the present invention.
Figure 4:
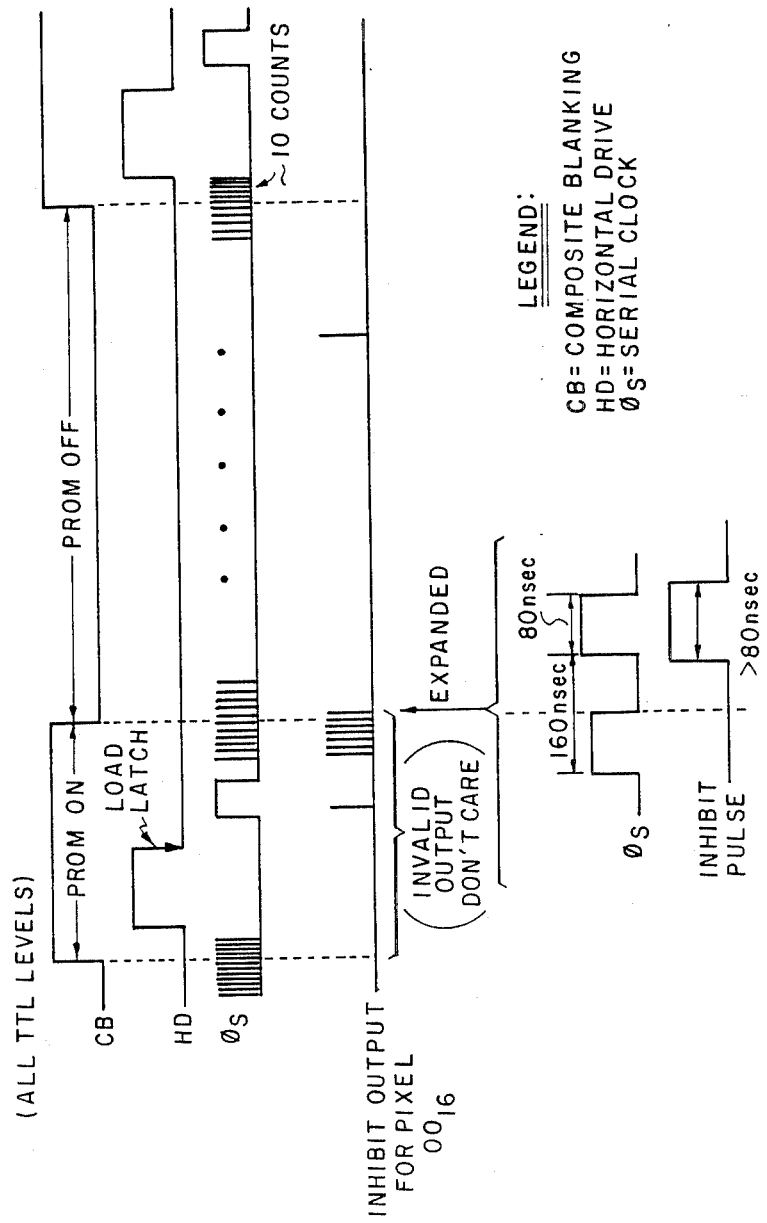
FIG. 4 is a timing diagram showing the timing signals used in the circuit of FIG. 3.

Referring now to FIG. 3, there is shown a circuit diagram of a preferred embodiment of the programmable defect compensator in accordance with the present invention wherein the timing signals utilized are set forth in the timing diagram of FIG. 4. There are 242 active lines of video. An eight bit counter 31 is therefore used as a line pointer which supplies the address for a programmable read only memory (PROM) 33. There are 328 pixels per horizontal line of video. A nine bit word is required to count each pixel with $2^9 - 328 = 184$ counts or 36% not used. To minimize chip count, an eight bit PROM 33 is selected. This results with 148 of the 328 pixels being double corrected.

A pixel count of $225_{10}$ or $FF_{16}$ is the default value which is programmed into the PROM 33 for a line in which no correction is desired. $FF_{16}$ is chosen as a default value to reduce power consumption in the PROM 33 and latch 35 with the assumption that there will be nondefective horizontal lines.

The PROM 33 is switched on only during the 10.5 microsecond horizontal blanking time at the end of each horizontal TV line (once every 63.5 microseconds) and at the time of monitor retrace, at which time the latch 35 is loaded with the eight bit data from the PROM which represents the pixel count of the defect on the next active horizontal line. The flip flop latch 35 is clocked with the horizontal drive pulse HD as shown in FIG. 4.

During an active horizontal line scan, the address or count of the defective pixel is compared in a comparator 39 to the output of an eight bit pixel counter 37 which is clocked by the CCD camera serial clock signal $\phi_s$ as shown in FIG. 4. When the comparison in the comparator 39 is true (i.e., the defective pixel address is the same as the count in the pixel counter 37), an inhibit pulse is generated by the comparator via a one shot 41 to prevent the sampling of that defective pixel.

The pixel counter 37 is reset to zero at horizontal blanking or composite blanking (CB in FIG. 4) and when the value of $FE_{16}$ is decoded in decoder 43 at the output of the pixel counter to allow for a default value of $FF_{16}$ in which the comparison will never result with an inhibit pulse. Originally, the value of $FF_{16}$ was decoded, but circuit propagation delays resulted in a pulse being generated at the default value. This results with one additional inverter and two non-pixel counts.

A one shot 45 is added to the serial clock which drives the pixel counter 37 to provide for phase shift of the output inhibit pulse with respect to the serial clock $\phi_s$. In actual circuit implementation, the comparison for the present pixel being scanned is performed during the previous pixel count so that the inhibit pulse can occur before the actual sample and hold pulse occurs.

The one shot 41 is provided to control the pulse width of the inhibit pulse. If two pixels must be removed in succession, the pulse can be expanded from 80 nanoseconds for one pixel to 240 nanoseconds for two pixels by adjustment of the variable resistor 47. This value can be set to any number of pixels, however each inhibit pulse will correct the same number of successive pixels.

As can be seen, there has been provided a rather simple and inexpensive circuit whereby the cosmetic appearance of the readout from a CCD is enhanced and whereby CCD devices with defects of minor character can be utilized, thereby increasing the potential yield.

Though the invention has been described with respect to a specific preferred embodiment thereof, many variations and modifications will immediately become apparent to those skilled in the art. It is therefore the intention that the appended claims are interpreted as broadly as possible in view of the prior to include all such variations and modifications.

We claim:
1. A method of compensating for defects in a selected CCD imager, comprising the steps of:
   (a) providing a selected CCD,
   (b) determining the address of defects in said selected CCD by:
   (c) first uniformly illuminating the CCD with a light source at about 50% full well level, then scanning the entire CCD, and
   (d) then determining which pixels of the CCD provide an indication of variance from said about 50% full well level by more than a predetermined amount,
   (e) providing a PROM,
   (f) permanently storing the addresses of said defects into said PROM,
   (g) scanning said selected CCD,
   (h) continually determining the address of said scan,
   (i) comparing the address of said scan with said address of defects in said PROM, and
   (j) providing an inhibit signal responsive to a predetermined relation between the address of defects stored in said PROM and the address of said scan.

2. The method of claim 1 further including the steps of providing a display and inhibiting alteration of signals to the display responsive to an inhibit signal.

3. A method of compensating for defects as set forth in claim 1, further including the steps of providing a sample and hold circuit and applying said inhibit signal to said sample and hold circuit to control operation of said sample and hold circuit.

4. A method of compensating for defects as set forth in claim 2, further including the steps of providing a sample and hold circuit and applying said inhibit signal to said sample and hold circuit to control operation of said sample and hold circuit.

* * * * *